United States Patent
Liu et al.

(10) Patent No.: US 10,340,799 B2
(45) Date of Patent: Jul. 2, 2019

(54) STEP-UP/DOWN POWER SUPPLY AND POWER SUPPLY CIRCUIT

(71) Applicant: Hitachi Automotive Systems, Ltd., Hitachinaka-shi, Ibaraki (JP)

(72) Inventors: Ming Liu, Tokyo (JP); Shinya Kajiyama, Tokyo (JP); Taizo Yamawaki, Tokyo (JP); Ryosuke Ishida, Hitachinaka (JP); Hirofumi Kurimoto, Hitachinaka (JP); Yasushi Sugiyama, Hitachinaka (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 0 days.

(21) Appl. No.: 15/772,128

(22) PCT Filed: Sep. 28, 2016

(86) PCT No.: PCT/JP2016/078566
§ 371 (c)(1),
(2) Date: Apr. 30, 2018

(87) PCT Pub. No.: WO2017/086028
PCT Pub. Date: May 26, 2017

(65) Prior Publication Data
US 2018/0316268 A1  Nov. 1, 2018

(30) Foreign Application Priority Data
Nov. 18, 2015  (JP) .................................. 2015-225628

(51) Int. Cl.
*H02M 3/158* (2006.01)
*G05F 1/40* (2006.01)
(Continued)

(52) U.S. Cl.
CPC ............ *H02M 3/1582* (2013.01); *G05F 1/40* (2013.01); *G06F 1/26* (2013.01); *H02M 1/08* (2013.01);
(Continued)

(58) Field of Classification Search
CPC ........ H02M 1/08; H02M 3/07; H02M 3/1582; G05F 1/40; G05F 1/44
See application file for complete search history.

(56) References Cited

U.S. PATENT DOCUMENTS

| 7,737,668 B2* | 6/2010 | Oswald | ............... H02M 3/1582 |
| | | | 323/259 |
| 2014/0252950 A1* | 9/2014 | Kikuchi | ............. H05B 33/0815 |
| | | | 315/77 |

(Continued)

FOREIGN PATENT DOCUMENTS

| JP | 10-23749 A | 1/1998 |
| JP | 2002-37099 A | 2/2002 |

(Continued)

OTHER PUBLICATIONS

International Search Report of PCT/JP2016/078566 dated Dec. 27, 2016.

*Primary Examiner* — Matthew V Nguyen
(74) *Attorney, Agent, or Firm* — Mattingly & Malur, PC

(57) ABSTRACT

A step-up/down power supply, in which a circuit area is small, includes a step-down unit that generates an output voltage lower than an input voltage by turning on or off a step-down switch in which the input voltage of the step-up/down power supply is applied, and a step-up unit that generates an output voltage higher than the input voltage by turning on or off a step-up switch in which a ground is applied. A step-down gate voltage control circuit controls a gate voltage of the step-down switch and includes a gate voltage generating circuit that generates a first voltage and
(Continued)

a second voltage for turning on the step-down switch. A gate voltage switching circuit switches between the first voltage and the second voltage, and the gate voltage generating circuit includes a first voltage source that generates the first voltage and a second voltage source that generates the second voltage.

7 Claims, 4 Drawing Sheets

(51) Int. Cl.
    *G06F 1/26*     (2006.01)
    *H02M 1/08*     (2006.01)
    *H02M 3/07*     (2006.01)
    *H02M 1/00*     (2006.01)

(52) U.S. Cl.
    CPC ...... *H02M 3/07* (2013.01); *H02M 2001/0022* (2013.01)

(56) References Cited

U.S. PATENT DOCUMENTS

| | | | | |
|---|---|---|---|---|
| 2015/0289325 A1* | 10/2015 | Szolusha | ............... | H05B 33/08 |
| | | | | 315/201 |
| 2015/0314754 A1* | 11/2015 | Eto | ............... | G08B 25/016 |
| | | | | 340/436 |
| 2017/0036555 A1* | 2/2017 | Albanna | ............ | B60L 11/1812 |

FOREIGN PATENT DOCUMENTS

| | | |
|---|---|---|
| JP | 2006-33971 A | 2/2006 |
| JP | 2008-29085 A | 2/2008 |
| JP | 2012-182884 A | 9/2012 |
| JP | 2014-175124 A | 9/2014 |

* cited by examiner

[Fig. 1]
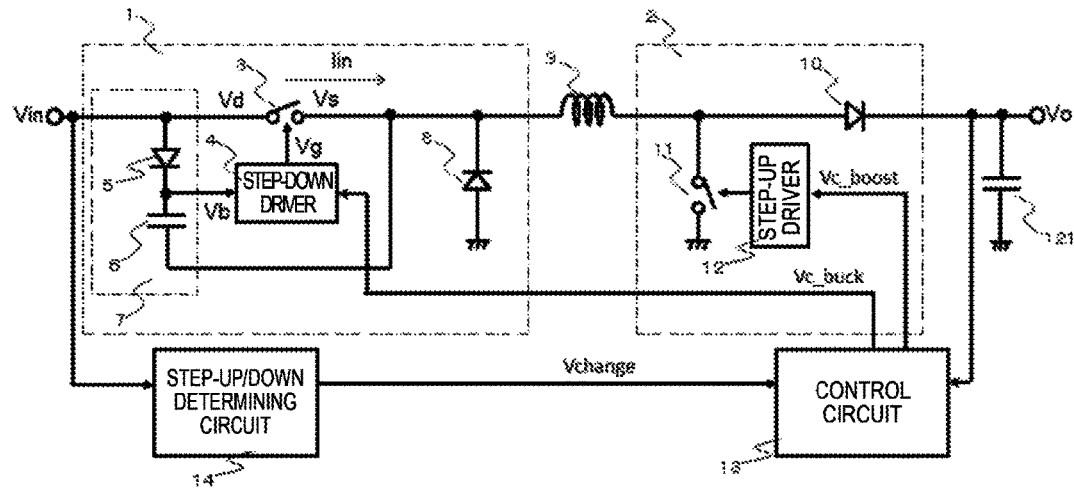
[Fig. 2]
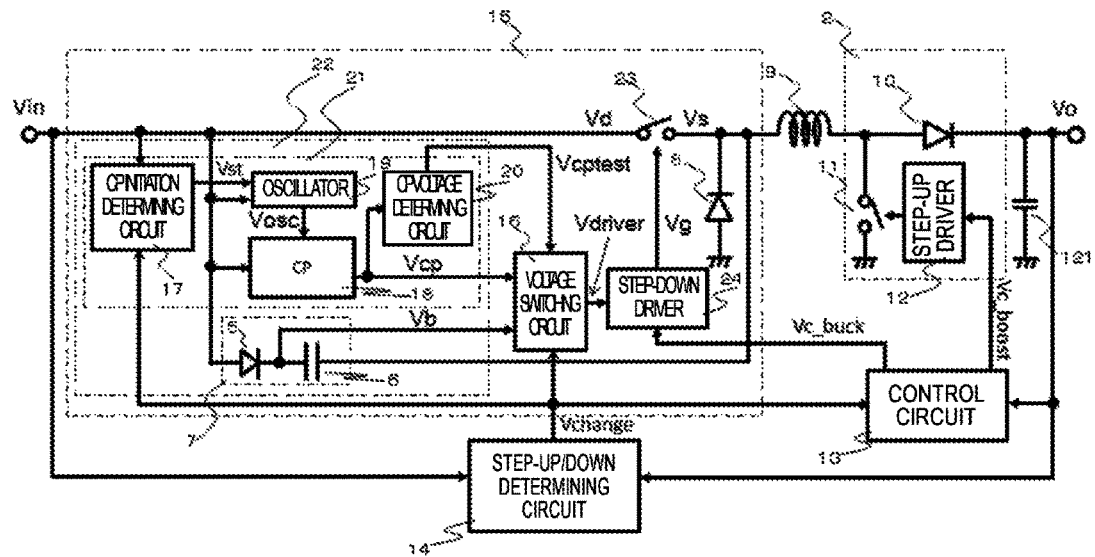

[Fig. 3]
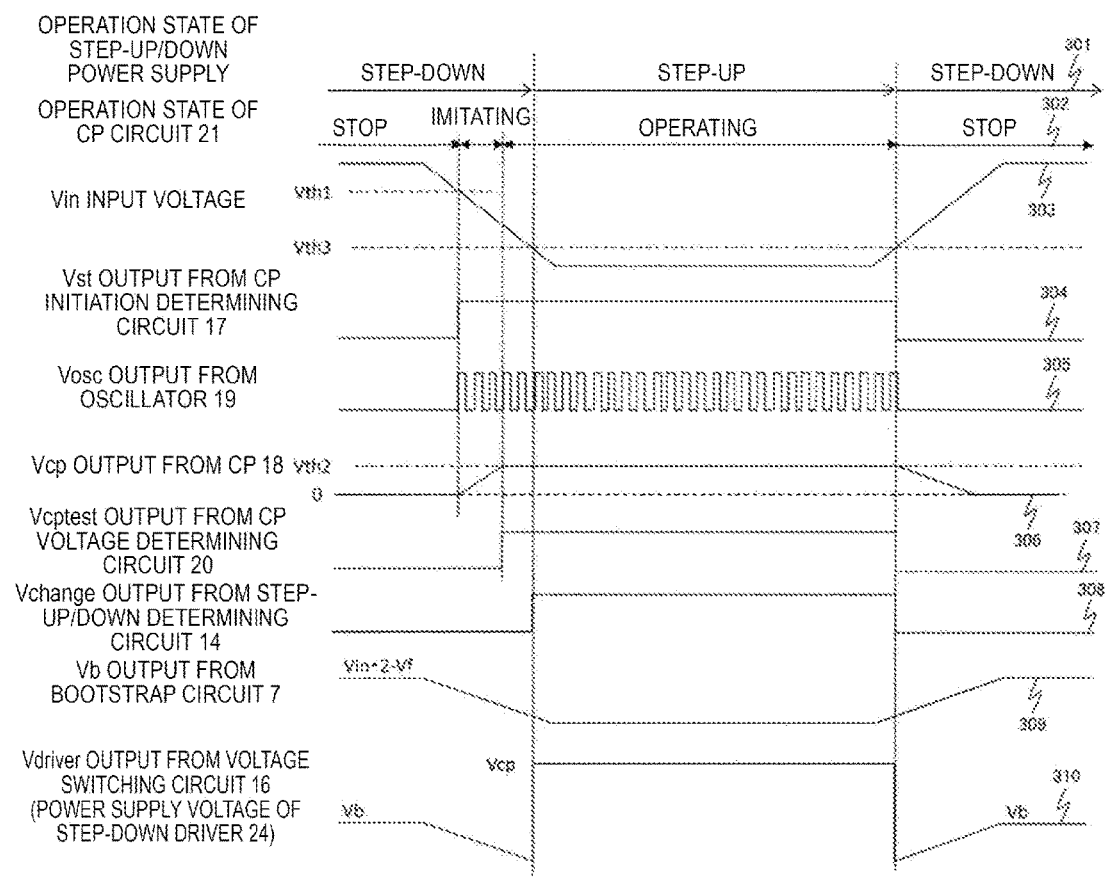

[Fig. 4]
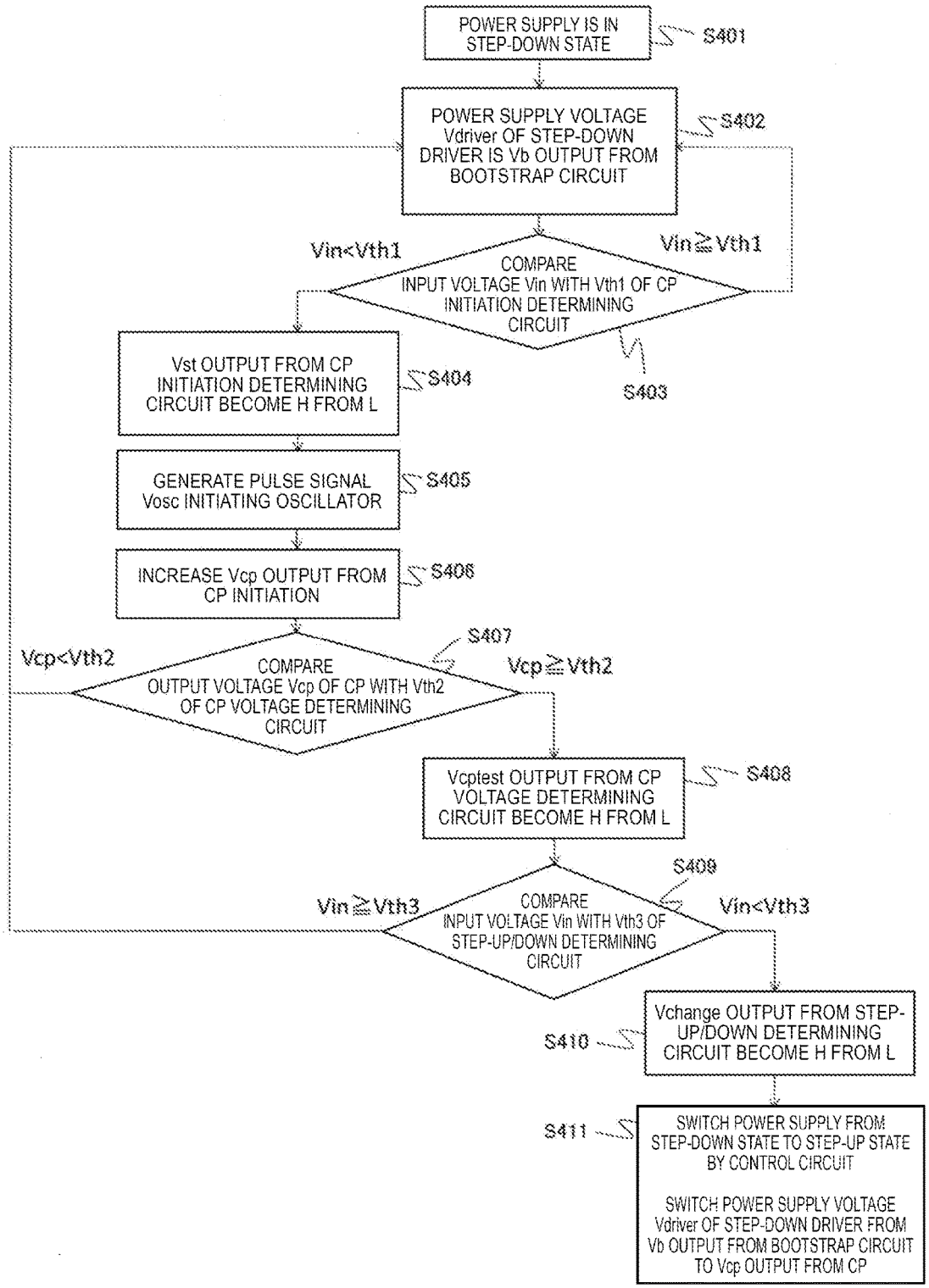

[Fig. 5]
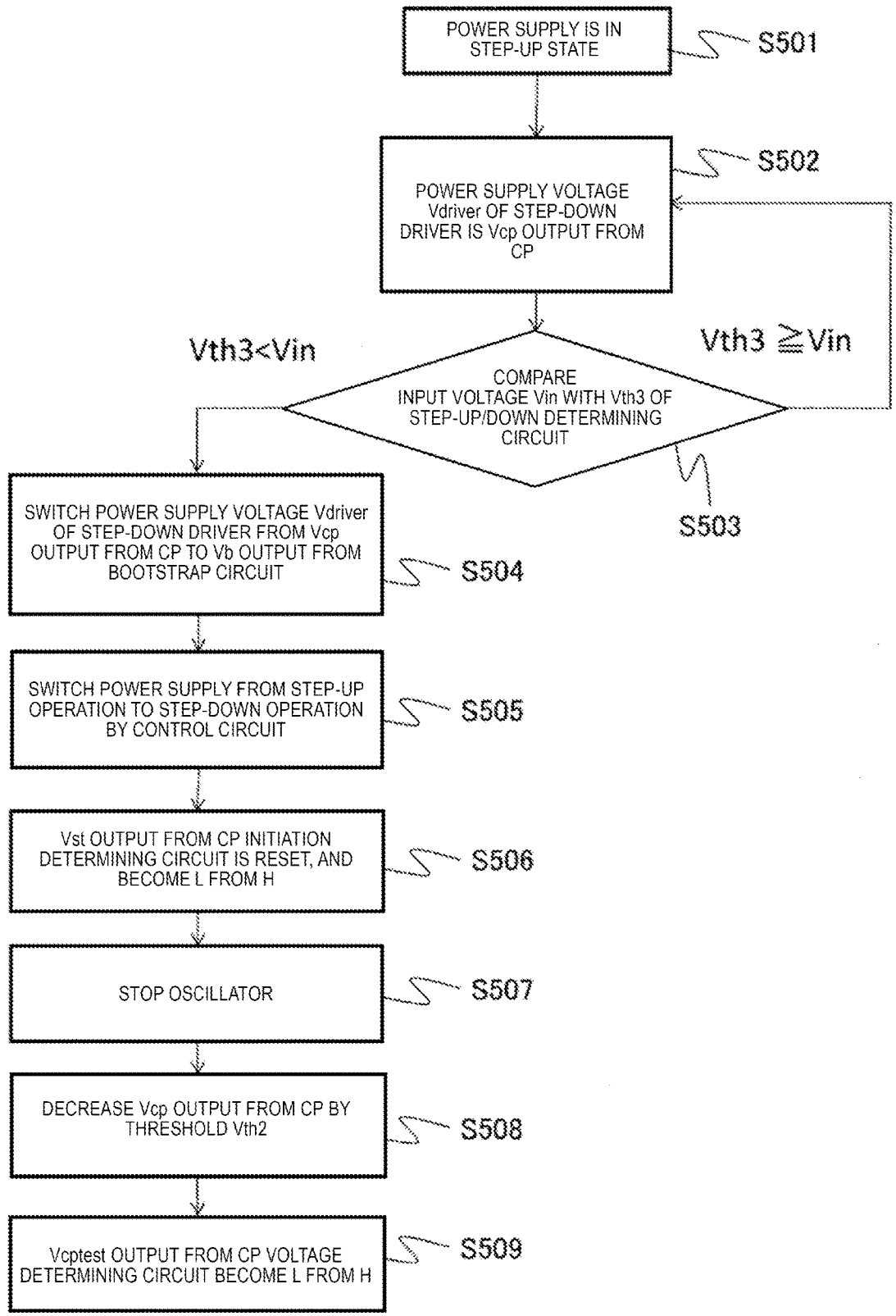

STEP-UP/DOWN POWER SUPPLY AND POWER SUPPLY CIRCUIT

TECHNICAL FIELD

The present invention relates to a switching power supply, and more particularly to a power supply suitable for an on-vehicle step-up/down power supply that generates a voltage for a micro-computer.

BACKGROUND ART

For example, in a field of automobile application, in order to reduce costs, a battery with a low output voltage (for example, 3V) is expected to be used. A power supply circuit of an engine control unit (ECU) of a current vehicle has only a step-down power supply having a step-down function from a voltage of a battery to a low voltage. Therefore, a step-up/down power supply having both a step-down function and a step-up function needs to be applied to the ECU.

As a power supply which is not used for the ECU but has both a step-down function and a step-up function, for example, there is PTL 1.

CITATION LIST

Patent Literature

PTL 1: JP-A-2014-175124

SUMMARY OF INVENTION

Technical Problem

In order to describe a step-up/down power supply using a bootstrap circuit in FIG. 1, drawings created by an inventor are illustrated as an example. The step-up/down power supply constituted using the bootstrap circuit is constituted by a step-down unit 1, a step-up unit 2, a control circuit 13, a step-up/down determining circuit 14, an inductor 9, and an output capacity 121. The step-down unit 1 is constituted by a switching element 3, a step-down driver 4, a bootstrap circuit 7, and a diode 8. The bootstrap circuit 7 is constituted by a diode 5 and a capacitor 6. The step-up unit 2 is constituted by a switching element 11, a step-up driver 12, and a diode 10. The switching element 3 or 11 is constituted by, for example, a transistor created by a semiconductor technique.

All operations of the step-up/down power supply at the time of stepping-down and stepping-up will be described as follows. Because of operations as follows, for example, even when an input voltage Vin of the step-up/down power supply being supplied from a battery is high or low, a stable output voltage Vo can be generated.

At the time of stepping-down when the input voltage Vin is high, the switching element 11 is continuously turned off, and the switching element 3 is switched. When the switching element 3 is turned on, energy from the input voltage Vin is transferred to the output voltage Vo through the inductor 9. In addition, at this time, current Iin flowing to the inductor 9 is accumulated in the inductor 9 as energy. When the switching element 3 is turned off, the energy charged in the inductor 9 is transferred to the output voltage Vo through the diodes 8 and 10. Accordingly, stepping-down is performed from the high input voltage Vin to the low output voltage Vo.

At the time of stepping-up when the input voltage Vin is low, the switching element 3 is continuously turned on, and the switching element 11 is switched. When the switching element 11 is turned on, the input voltage Vin causes energy to be accumulated in the inductor 9. When the switching element 11 is turned off, the energy accumulated in the inductor 9 and energy from both sides of the input voltage Vin are transferred to the output voltage Vo through the diode 10. Accordingly, stepping-up is performed from the low input voltage Vin to the high output voltage Vo.

An operation and a function of each circuit of the step-up/down power supply of FIG. 1 will be described as follows.

When the input voltage Vin and the output voltage Vo are compared to each other, the step-up/down determining circuit 14 is a circuit that generates a high signal, for example, in a case in which the input voltage Vin is higher than the output voltage Vo, and generates a low signal in a case in which the input voltage Vin is lower than the output voltage Vo.

The control circuit 13 is a circuit that generates control signals Vc_buck and Vc_boost by a signal Vchange generated by the step-up/down determining circuit 14 and a feedback signal from the output voltage Vo, controls the step-down unit 1 and the step-up unit 2, and generates a stable output voltage Vo even when the input voltage Vin becomes lower or higher than the output voltage Vo to be required.

The step-down driver 4 and the step-up driver 12 are circuits that receive the control signals Vc_buck and Vc_boost from the control circuit 13, and drive the switching elements 3 and 11 to be turned on or off at a high speed.

Operations of the step-down unit 1 and the step-up unit 2 are described as follow.

When the step-up/down determining circuit 14 determines that the input voltage Vin is lower than the output voltage Vo, the switching element 3 of the step-down unit 1 is continuously turned on by the control signals Vc_buck and Vc_boost from the control circuit 13, the switching element 11 of the step-up unit 2 is switched, and the output voltage Vo is stepped-up to a required voltage.

When the step-up/down determining circuit 14 determines that the input voltage Vin is higher than the output voltage Vo, the switching element 3 of the step-down unit 1 is switched by the control signals Vc_buck and Vc_boost from the control circuit 13, the switching element 11 of the step-up unit 2 is continuously turned off, and the output voltage Vo is stepped-down to a required voltage.

A principle and an operation of the bootstrap circuit 7 in the step-down unit 1 will be described as follows.

In order to fully turn on using the switching element 3, a sufficient gate-source voltage Vgs (=Vg−Vs) is required. Further, when the switching element 3 is turned on, a source voltage Vs is substantially same level as a drain voltage Vd.

Accordingly, the gate voltage Vg of the switching element 3 is required a sufficient voltage higher than the drain voltage Vd. However, the drain voltage Vd of the switching element 3 is the input voltage Vin so as to become the highest voltage in the circuits. The bootstrap circuit fully turns on the switching element 3, and generates a higher voltage than the input voltage Vin.

When the switching element 3 is turned off, the diode 8 is conducted, and the source voltage Vs of the switching element 3 becomes substantially a GND voltage. At this time, the input voltage Vin charges the capacitor 6 through the diode 5 of the bootstrap circuit 7, and a voltage Vb between the capacitor 6 and the diode 5 becomes an input voltage Vin−Vf.

Vf is a forward voltage of the diode 5. When the switching element 3 is turned on, the source voltage Vs is substantially the same level as the drain voltage Vd, that is, the input voltage Vin, and thus the other end voltage of the capacitor 6 increases to the input voltage Vin. Accordingly, when the switching element 3 is turned on, the voltage Vb between the capacitor 6 and the diode 5 can be increased to 2Vin−Vf. This voltage Vb becomes a power supply voltage of the step-down driver 4, and becomes the gate voltage Vg when the switching element 3 is turned on. Accordingly, it is possible to fully turn on the switching element 3.

A problem of the step-up/down power supply of FIG. 1 is that a circuit area is larger than as that in a case of only step-down power supply. Accordingly, costs of the power supply circuit increase. Reasons thereof are two as follows.

<1> Peak values Iin_boost and Iin_buck of the current Iin flowing to the switching element 3 at the time of stepping-up and stepping-down are obtained by Expressions (1) and (2) as follows. Iin_boost at the time of stepping-up is a multiple of Vo/Vin_boost of Iin_buck at the time of stepping-down. Therefore, in order to realize the same efficiency, on-resistance of the switching element 3 at the time of stepping-up is needed to be a multiple of Vin_boost/Vo at the time of stepping-down, and an area of the switching element 3 of the step-up/down power supply is needed to be a multiple of Vo/Vin_boost in a case of only the step-down power supply. Since the input voltage Vin_boost at the time of stepping-up is lower than the output voltage Vo, the area of the switching element 3 of the step-up/down power supply is larger than that in the case of only the step-down power supply.

At the time of stepping-up $Iin\_boost = Vo \cdot Io/Vin\_boost$     Expression (1)

At the time of stepping-down $Iin\_buck = Io$     Expression (2)

Vin_boost: input voltage at the time of stepping-up
Vin_buck: input voltage at the time of stepping-down <2> The gate voltage Vg turning on the switching element 3 of the step-up/down power supply of FIG. 1 is generated by the bootstrap circuit, and is obtained by Expression (3) as follows.

(Vf: forward voltage value of diode of bootstrap circuit)

$Vg = Vin \cdot 2 - Vf$     Expression (3)

By Expression (3), the gate voltages Vg_boost and Vg_buck, which are generated by the bootstrap circuit, when the switching element 3 is turned on at the time of stepping-up and down become Vin_boost·2−Vf and Vin_buck·2−Vf. In order to realize the same efficiency of power supply, a source-drain voltage Vds at the time of stepping-up and down is required to be the same. In addition, the drain voltages Vd_boost and Vd_buck of the switching element 3 at the time of stepping-up and down are Vin_boost and Vin_buck, and thus the source voltages Vs_boost and Vs_buck become Vin_boost-Vds and Vin_buck-Vds. Accordingly, a gate-source voltages Vgs_boost and Vgs_buck of the switching element 3 at the time of stepping-up and down become (Vin_boost−Vf+Vds) and (Vin_buck−Vf+Vds). Since the on-resistance of MOS is proportional to the gate-source voltage so that the same on-resistance is realized, the area of the switching element 3 of the step-up/down power supply is needed to be a multiple of (Vin_buck−Vf+Vds)/(Vin_boost−Vf+Vds) in the case of only the step-down power supply. Since the input voltage Vin_boost at the time of stepping-up is lower than the input voltage Vin_buck at the time of stepping-down, the area of the switching element 3 of the step-up/down power supply is larger than that in the case of only the step-down power supply.

The same efficiency of power supply is realized because of the two reasons, and thus, in a configuration of FIG. 1, the area of the switching element 3 of the step-up/down power supply is needed to be larger than that in the case of only the step-down power supply. When the area of the switching element 3 is increased, a circuit area of the power supply is increased, and thus costs of the power supply circuit are increased.

In addition, the bootstrap circuit 7 in the step-down unit 1 can be replaced to a charge pump circuit for increasing a voltage by combining a capacitor and a switch, but when the step-up/down power supply is stepped-down, the switching element 3 is needed to be switched at a high speed, and thus the charge pump circuit having a sufficient high current driving capability is required to be used. Accordingly, an area of the charge pump circuit becomes significantly large, the circuit area of the power supply, and costs of the power supply circuit are increased.

An object of the invention is to provide a step-up/down power supply including a small circuit area.

Solution to Problem

According to an aspect of the invention to solve the above-described problems, there is provided a step-up/down power supply including a step-down unit that generates an output voltage lower than an input voltage by turning on or off a step-down switch in which the input voltage of the step-up/down power supply is applied to an end of the step-down switch, a step-up unit that generates an output voltage higher than the input voltage by turning on or off a step-up switch in which a ground is applied to an end of the step-down switch, and a step-down gate voltage control circuit that controls a gate voltage of the step-down switch. The step-down gate voltage control circuit includes a gate voltage generating circuit that generates a first voltage and a second voltage for turning on the step-down switch, and a gate voltage switching circuit that switches between the first voltage and the second voltage, and the gate voltage generating circuit includes a first voltage source that generates the first voltage and a second generation voltage source that generates the second voltage.

According to another aspect of the invention, there is provided a step-up/down power supply including a step-down unit that generates an output voltage lower than an input voltage by turning on or off a step-down switch in which the input voltage of the step-up/down power supply is applied to an end of the step-down switch, a step-up unit that generates an output voltage higher than the input voltage by turning on or off a step-up switch in which a ground is applied to an end of the step-down switch, and a step-down gate voltage control circuit that controls a gate voltage of the step-down switch. The step-down gate voltage control circuit includes a gate voltage generating circuit that generates a first voltage and a second voltage for turning on the step-down switch, and a gate voltage switching circuit that switches between the first voltage and the second voltage, the gate voltage generating circuit includes a first generating circuit generating the first voltage and a second generating circuit generating the second voltage, and a load current for driving the second generating circuit is greater than that of the first generating circuit.

According to still another aspect of the invention, there is provided a step-up/down power supply circuit that generates an output voltage from an input voltage, including a step-up unit that steps-up the input voltage, and a step-down unit that steps-down the input voltage, the step-down unit including a step-down switch constituted by a semiconductor transistor in which the input voltage is supplied to a first terminal of the semiconductor transistor, and a step-down gate voltage control circuit which switches between a first circuit having a different output voltage level and a second circuit different from the first circuit and supplies a gate voltage of the step-down switch.

In a specific configuration example of the invention, the step-down switch is continuously turned on at the time of a step-up operation for generating the output voltage higher than the input voltage, and the step-down switch is operated to be switched at the time of a step-down operation for generating the output voltage lower than the input voltage. The step-down gate voltage control circuit supplies a voltage of a first level from the first circuit as the gate voltage of the step-down switch at the time of the step-up operation, and supplies a voltage of a second level lower than the first level as the gate voltage of the step-down switch from the second circuit different from the first circuit at the time of the step-down operation.

In another specific configuration example of the invention, the step-down switch is continuously turned on at the time of a step-up operation for generating the output voltage higher than the input voltage, the step-down switch is operated to be switched at the time of a step-down operation for generating the output voltage lower than the input voltage. The step-down gate voltage control circuit supplies the gate voltage of the step-down switch from a charge pump circuit which is the first circuit at the time of the step-up operation, and supplies the gate voltage of the step-down switch from a bootstrap circuit which is the second circuit at the time of the step-down operation.

In still another specific configuration example of the invention, an inductor is connected to a second terminal of the step-down switch, the step-up unit includes a step-up switch, a first terminal of the step-up switch is connected to a ground potential, a second terminal is connected to the inductor, and a connection point of the second terminal and the inductor is connected to an output terminal for obtaining the output voltage, the power supply circuit further includes a control circuit that controls operations of the step-down switch and the step-up switch. The control circuit controls the step-down switch so as to perform a switching operation and continuously turns off the step-up switch, at the time of the step-down operation for generating the output voltage lower than the input voltage, and controls the step-up switch so as to perform the switching operation and continuously turns on the step-down switch, at the time of the step-up operation for generating the output voltage higher than the input voltage. The step-down gate voltage control circuit supplies the gate voltage of the step-down switch from the charge pump circuit which is the first circuit at the time of the step-up operation, and supplies the gate voltage of the step-down switch from the bootstrap circuit which is the second circuit at the time of the step-down operation.

In still yet another specific configuration example of the invention, the second circuit supplies the voltage of the second level lower than the first level as the gate voltage of the step-down switch, and the second circuit has higher current driving capability and a lower output voltage level than that of the first circuit.

In still yet another specific configuration example of the invention, the first circuit and the second circuit independently input and output a voltage.

Other new features of the invention are apparent from description of this specification and attached drawings.

Advantageous Effects of Invention

It is possible to provide a step-up/down power supply having a small circuit area.

BRIEF DESCRIPTION OF DRAWINGS

FIG. 1 is a circuit diagram illustrating a configuration example of a step-up/down power supply.

FIG. 2 is a circuit diagram illustrating a configuration of the step-up/down power supply of Embodiment 1.

FIG. 3 is a timing chart of switching between stepping-up and stepping-down of the step-up/down power supply of Embodiment 1.

FIG. 4 is a flow chart of a switching operation of the step-up/down power supply of Embodiment 1 from stepping-down to stepping-up.

FIG. 5 is a flow chart of a switching operation of the step-up/down power supply of Embodiment 1 from stepping-up to stepping-down.

DESCRIPTION OF EMBODIMENTS

Hereinafter, with reference to drawings, embodiments indicating the invention will be described in detail. However, it is not understood that the invention is limited to disclosed contents of embodiments to be described later. Those skilled in the art easily understand a resultant obtained by changing a specific configuration thereof within a range not departing from a sprit or gist of the invention.

In a configuration of the invention to be described later, the same numeral is commonly used for the same part or a part having the same function in other drawings, and repeated description thereof will be omitted.

A notation such as a "first", a "second", or a "third" in this specification is attached to identify a configuration element, and is not necessary to limit to the numeral or an order. In addition, the numeral for identifying the configuration element is used in each context, and the numeral used for one context is not necessary to limit to indicating the same configuration in other contexts. In addition, it does not preclude the configuration element identified by a certain numeral from serving as a function of a configuration element identified by another numeral.

Each configuration such as a position, a size, a shape, or a range illustrated in drawings or the like may not indicate an actual position, size, shape, range, and the like for easily understating the invention. Therefore, the invention is not necessary to limit to positions, sizes, shapes, ranges, and the like disclosed in drawings.

An outline of representative of the embodiments disclosed hereinafter will be simply described as follows.

1) A power supply voltage of a driver of a switching element 3 is generated by switching between a bootstrap circuit and a charge pump circuit.

2) When the step-up/down determining circuit determines that the input voltage Vin becomes lower than the output voltage Vo, a power supply is in a step-up mode, and the switching element 3 is continuously turned on. The power supply voltage of the driver of the switching element 3 is switched from the bootstrap circuit to the charge pump circuit by a voltage switching circuit at this timing.

3) When the step-up/down determining circuit determines that the input voltage Vin becomes higher than the output voltage Vo, the power supply is in a step-down mode, and the switching element 3 is switched. The power supply voltage of the driver of the switching element 3 is switched from the charge pump circuit to the bootstrap circuit by the voltage switching circuit at this timing.

[Embodiment 1]

<1. Entire Configuration>

FIG. 2 is a diagram illustrating a configuration of a step-up/down power supply of Embodiment 1. The same numeral is given to the same configuration part in FIGS. 2 and 1.

The step-up/down power supply of Embodiment 1 is constituted by a step-down unit 15, a step-up unit 2, a control circuit 13, a step-up/down determining circuit 14, an inductor 9, and an output capacity 121. Since the step-up unit 2, the control circuit 13, the step-up/down determining circuit 14, the inductor 9, the output capacity 121 are the same as those of FIG. 1, description thereof will be omitted. The step-down unit 15 is constituted by a switching element 23, a diode 8, a step-down driver 24, a voltage switching circuit 16, and a gate voltage generating circuit 22. The gate voltage generating circuit 22 is constituted by a charge pump (CP) circuit 21 and a bootstrap circuit 7. Since the bootstrap circuit 7 is the same as that of FIG. 1, description thereof will be omitted. The charge pump (CP) circuit 21 is constituted by a charge pump (CP) initiation determining circuit 17, an oscillator 19, a charge pump (CP) 18, and a charge pump (CP) voltage determining circuit 20.

As the charge pump circuit 21, a known electronic circuit for increasing a voltage can be used by combining the capacitor and the switch. As the oscillator 19, a known configuration can be also used. In addition, as the bootstrap circuit 7, a known electronic circuit constituted by a capacitor and a diode can be used. FIG. 2 illustrates an example, but it is not limited to this configuration. As illustrated in FIG. 2, the charge pump circuit 21 and the bootstrap circuit 7 are separately and independently configured, and input or output is also independent. Each of output voltages Vcp and Vb is input to the voltage switching circuit 16, and either of the output voltages is selected and supplied to the step-down driver 24.

At the time of stepping-up and down, the entire operations of the step-up/down power supply of Embodiment 1 will be described as follows.

At the time of stepping-down, the switching element 11 is continuously turned off, and the switching element 23 is switched. When the switching element 23 is turned on, energy is transferred to the output voltage Vo from the input voltage Vin through the inductor 9. In addition, at this time, a current flowing to the inductor 9 is accumulated in the inductor 9 as energy. When the switching element 23 is turned off, the energy charged in the inductor 9 is transferred to the output voltage Vo through the diode 8. Accordingly, stepping-down is performed from a high input voltage Vin to a low output voltage Vo.

At the time of stepping-up, the switching element 23 is continuously turned on, and the switching element 11 is switched. When the switching element 11 is turned on, the input voltage Vin is accumulated in the inductor 9 as energy. When the switching element 11 is turned off, the energy charged in the inductor 9 and energy from both sides of the input voltage Vin are transferred to the output voltage Vo through the diode 10. Accordingly, stepping-up is performed from a low input voltage Vin to a high output voltage Vo.

An operation and a function of each circuit of the step-down unit 15 of Embodiment 1 will be described as follows.

The gate voltage generating circuit 22 generates two types of voltages of a charge pump voltage Vcp generated by the charge pump (CP) circuit 21 and a bootstrap voltage Vb generated by the bootstrap circuit 7. Since an operation of the bootstrap circuit 7 is the same as FIG. 1, description thereof will be omitted.

An operation of each circuit of the charge pump (CP) circuit 21 will be described as follows.

The charge pump (CP) initiation determining circuit 17 controls switching of an operation state (stop, initiating, and operating) of the oscillator 19 by a determining signal Vst which is generated depending on a magnitude of the input voltage Vin and a determining signal Vchange output from the step-up/down determining circuit 14.

The oscillator 19 generates a pulse signal Vosc.

The charge pump (CP) 18 is a circuit for increasing a voltage by combining a plurality of capacitors and a plurality of switches, and generates a high voltage Vcp from the input voltage Vin by the pulse signal Vosc from the oscillator 19.

The charge pump (CP) voltage determining circuit 20 generates a determining signal Vcptest if the output voltage Vcp of the charge pump (CP) 18 becomes a desired voltage, and inputs the determining signal to the voltage switching circuit 16.

The voltage switching circuit 16 outputs the bootstrap voltage Vb and the charge pump voltage Vcp which are input in a switching manner as a power supply voltage Vdriver of the step-down driver 16 depending on the determining signal Vcptest from the charge pump (CP) voltage determining circuit 20 and the determining signal Vchange from the step-up/down determining circuit 14.

The step-down driver 24 is a circuit which receives a control signal Vc_buck of the control circuit 13 and drives the switching element 23 so as to be turned on and off at a high speed. In addition, the gate voltage Vg causing the switching element 23 to be turned on becomes an output of the voltage switching circuit 16, that is, the power supply voltage Vdriver of the step-down driver 24.

<2. Operation Sequence>

Hereinafter, with reference to FIGS. 3 to 5, when an operation state of the step-up/down power supply of Embodiment 1 is switched from stepping-down to stepping-up and from stepping up to stepping-down, a change of the gate voltage Vg causing the switching element 23 to be turned on will be described.

FIG. 3 is a timing chart of each signal and an output voltage when the step-up/down power supply of Embodiment 1 is switched from stepping-down and stepping-up. FIGS. 4 and 5 are respectively an operation flow of switching from stepping-down to stepping-up and an operation flow of switching from stepping-up to stepping-down of the step-up/down power supply of Embodiment 1.

<2-1. When Operation State of Step-Up/Down Power Supply of Embodiment 1 is Switched from Stepping-Down to Stepping-Up:>

With reference to FIGS. 4 and 3, an operation flow of switching from stepping-down to stepping-up of the step-up/down power supply will be described. When an operation state 301 of the step-up/down power supply is stepped-down (S401), the gate voltage Vg causing the switching element 23 to be turned on, that is, a power supply voltage Vdriver 310 of the step-down driver 24 is the output signal Vb (=Vin·2−Vf) of the bootstrap circuit 7 (S402). At this time, a state 302 of the charge pump (CP) circuit 21 is a stop state. In addition, since an input voltage Vin 303 is higher than a threshold Vth3 in the step-up/down determining circuit 14, a determining signal Vchange 308 output from the step-up/down determining circuit 14 is low.

While the determining signal Vchange 308 output from the step-up/down determining circuit 14 is low as it is, if the input voltage Vin 303 becomes lower than (or may be equal to or less) a threshold Vth1 in the charge pump (CP) initiation determining circuit 17 (S403), a determining signal Vst 304 output from the charge pump (CP) initiation determining circuit 17 becomes high from low (S404), and the state 302 of the charge pump (CP) circuit 21 becomes an initiating state. An operation of the oscillator 19 is initiated by the determining signal Vst, generation of the pulse signal Vosc is started (S405), and the output voltage Vcp of the charge pump (CP) 18 is increased (S406).

If the output voltage Vcp of the charge pump (CP) 18 becomes (or may exceed) the threshold Vth2 in the charge pump (CP) voltage determining circuit 20 (S407), the determining signal Vcptest output from the output of the charge pump (CP) voltage determining circuit 20 becomes high from low, and the state 302 of the charge pump (CP) circuit 21 becomes the operation state from the initiating state (S408).

At this time, if the input voltage Vin becomes (or may be equal to or less) lower than the threshold Vth3 in the step-up/down determining circuit 14 (S409), the determining signal Vchange 308 output from the step-up/down determining circuit 14 becomes high from low (S410). If both the determining signals Vchange 308 and Vcptest 307 become high, the output voltage Vdriver 310 of the voltage switching circuit 16 is switched from the output voltage Vb (=Vin·2−Vf) 309 of the bootstrap circuit 7 to an output voltage Vcp 306 of the charge pump (CP) 18. In addition, at the timing when the determining signal Vchange 308 output from the step-up/down determining circuit 14 becomes high from low, the operation state 301 of the step-up/down power supply is switched from stepping-down to stepping-up by the control circuit 13 (S411).

Also, in this example, since the bootstrap circuit 7 is continuously operated even after being switched to be output from the charge pump (CP) 18, the output voltage Vb 309 of the bootstrap circuit 7 does not become zero, but the output is decreased as the input voltage Vin 303 is decreased. The bootstrap circuit 7 may be configured to be stopped to be operated after being switched to be output from the charge pump (CP) 18, but in this case, an initiation timing of the bootstrap circuit is needed to be considered.

<2-2. When Operation State of Step-Up/Down Power Supply of Embodiment 1 is Switched from Stepping-Up to Stepping-Down:>

With reference to FIG. 5 and FIG. 3, an operation flow of switching from stepping-up to stepping-down of the step-up/down power supply will be described. When the operation state of the step-up/down power supply is stepped-up (S501), the gate voltage Vg causing the switching element 23 to be turned on, that is, the power supply voltage Vdriver 310 of the step-down driver 24 is the output voltage Vcp 306 of the charge pump (CP) 18 (S502). At this time, the state 302 of the charge pump (CP) circuit 21 is an operation state.

If the input voltage Vin 303 exceeds the threshold Vth3 in the step-up/down determining circuit 14 (S503), the determining signal Vchange 308 output from the step-up/down determining circuit 14 becomes low from high. At this timing, the output voltage Vdriver 310 of the voltage switching circuit 16 is switched to the output voltage Vb (=Vin·2−Vf) 309 of the bootstrap circuit 7 from the output voltage Vcp 306 of the charge pump (CP) 18 (S504). In addition, at this timing, the operation state 301 of the step-up/down power supply is switched from stepping-up to stepping-down by the control circuit 13 (S505). In addition, because of an operation of switching of the determining signal Vchange 308 output from the step-up/down determining circuit 14 from high to low, the charge pump (CP) initiation determining circuit 17 is reset, and a determining signal Vst 304 of an output is switched from high to low (S506). A state of the oscillator 19 becomes a stop state from an operation state by the determining signal Vst, and the pulse signal Vosc 305 is stopped to be generated (S507). Accordingly, the output voltage Vcp 306 of the charge pump (CP) 18 decreases (S508). If the output voltage Vcp 306 of the charge pump (CP) 18 is lower than the threshold Vth2 in the charge pump (CP) voltage determining circuit 20, the determining signal Vcptest 307 output from the charge pump (CP) voltage determining circuit 20 becomes low from high, and the state 302 of the charge pump (CP) circuit 21 becomes a stop state from the operation state (S509).

<3. Setting Example of Control Threshold>

Hereinafter, a relationship of the threshold Vth1 in the charge pump (CP) initiation determining circuit 17, the threshold Vth2 in the charge pump (CP) voltage determining circuit 20, and the threshold Vth3 in the step-up/down determining circuit 14, and a determining method of each of the thresholds will be described.

Contrary to the bootstrap circuit 7, in order to cause the charge pump (CP) circuit 21 to become the operation state from the stop state, an initiating time is taken. If, during the initiating time of the charge pump (CP) circuit 21, the step-up/down power supply is switched from stepping-down to a stepping-up state, and the gate voltage Vg causing the switching element 23 to be turned on, that is, the power supply voltage Vdriver 310 of the step-down driver 24 is switched from the output voltage Vb 309 of the bootstrap circuit 7 to the output voltage Vcp 306 of the charge pump (CP) 18, since the output voltage Vcp 306 of the charge pump (CP) 18 does not become a desired high voltage yet, on-resistance of the switching element 23 is increased, and efficiency of the step-up/down power supply is deteriorated. Therefore, it is preferable that the threshold Vth1 in the charge pump (CP) initiation determining circuit 17 be set to be higher than the threshold Vth3 in the step-up/down determining circuit 14.

The threshold Vth3 in the step-up/down determining circuit 14 is a value required to switch the operation state of the step-up/down power supply between a stepping up state and a stepping-down state depending on a magnitude relationship of the input voltage Vin and a desired output voltage Vo. When the input voltage Vin 303 is higher than the output voltage Vo, the operation state of the step-up/down power supply is needed to be the stepping-down state, and when the input voltage Vin 303 is lower than the output voltage Vo, the operation state is needed to be the stepping-up state. Therefore, the threshold Vth3 in the step-up/down determining circuit 14 may be set to be the same as the desired output voltage Vo.

The threshold Vth1 in the charge pump (CP) initiation determining circuit 17 is determined depending on the initiating time of the charge pump (CP) circuit 21, a maximum decrease speed of the input voltage Vin 303, and the threshold Vth3 in the step-up/down determining circuit 14. For example, in a case in which the initiating time of the charge pump (CP) circuit 21 is Aus, and the maximum decrease speed of the input voltage Vin 303 is B/us. The threshold Vth1 in the charge pump (CP) initiation determining circuit 17 becomes Vth3+A·B.

The threshold Vth2 in the charge pump (CP) voltage determining circuit 20 is a value of the output voltage Vcp 306 of the desired charge pump (CP) 18, and is desirably set to be higher than both the threshold Vth1 in the charge pump (CP) initiation determining circuit 17 and the threshold Vth3 in the step-up/down determining circuit 14. The value of the output voltage Vcp 306 of the desired charge pump (CP) 18 is obtained with reference to description as follows.

Regarding the problem of the step-up/down power supply of FIG. 1, for two reasons to be described later, the area of the switching element 3 is larger than that in the case of only the step-down power supply.

<1> An input current Iin_boost at the time of stepping-up is a multiple of Vo/Vin_boost of Iin_buck at the time of stepping-down. Therefore, in order to realize the same efficiency, the area of the switching element 3 is needed to be a multiple of Vo/Vin_boost in the case of only the step-down power supply.

<2> The gate-source voltages Vgs_boost and Vgs_buck of the switching element 3 at the time of stepping-up and down respectively becomes (Vin_boost−Vf+Vds) and (Vin_buck−Vf+Vds). Therefore, in order to realize the same efficiency, the area of the switching element 3 of the step-up/down power supply is needed to be a multiple of (Vin_buck−Vf+Vds)/(Vin_boost−Vf+Vds) in the case of only the step-down power supply.

For example, at the time of the desired output voltages of Vo=6V, Vin_boost=5V, Vin_buck=7V, Vf=1V, and Vds=0.5V, Because of <1>, the area of the switching element 3 is needed to be multiplied by 1.2 of the case of only the step-down power supply.

Because of <2>, the area of the switching element 3 is needed to be multiplied by 1.4 of the case of only the step-down power supply.

With the reasons <1> and <2>, the area of the switching element 3 is needed to be a multiple of 1.2·1.4=1.68 in the case of only the step-down power supply. Therefore, since the area of the switching element 3 of the step-up/down power supply of FIG. 1 becomes the same as that in the case of only the step-down power supply, the gate-source voltage Vgs_boost (4.5V) of the switching element 3 at the time of stepping-up is theoretically needed to be improved by 1.68 times of Vgs_buck (6.5V) at the time of stepping-down, that is, 10.92V. Since the drain voltage Vd_boost of the switching element 3 at the time of stepping-up is Vin_boost (5V), the source voltage Vs_boost becomes Vin_boost (5V)−Vds (0.5V)=4.5V. Accordingly, at the time of stepping-up, a required gate voltage Vg of the switching element 3 becomes Vgs_boost (10.92V)+Vs_boost (4.5V)=15.42V.

That is, since the area of the switching element 3 of the step-up/down power supply of FIG. 1 becomes the same as that of the case of only the step-down power supply, a value of the output voltage Vcp 306 of the desired charge pump (CP) 18 of the step-up/down power supply in FIG. 2 of Embodiment 1 is needed to be 15.42 V. This value becomes the threshold Vth2 in the charge pump (CP) voltage determining circuit 20.

When the step-up/down power supply of Embodiment 1 is applied, an area of the switching element 23 is possible to be the same as that in the case of only the step-down power supply. Accordingly, an increase of costs of the step-up/down power supply can be suppressed.

According to the example described above, at the time of stepping-up, the switching element 3 is continuously turned on. According to the embodiments, in the step-up/down power supply, at the time of stepping-up, the gate voltage causing the switching element 3 to be continuously turned on is generated by the charge pump circuit. Since the switching element 3 is driven to be turned on by a higher voltage than the voltage generated from the bootstrap circuit of FIG. 1, the area of the switching element 3 can be reduced.

In this example, as the bootstrap circuit, a circuit of which a current driving capability is high and an output voltage level is low, and as the charge pump circuit, a circuit of which a current driving capability is low and an output voltage level is high are appropriately used at the time of stepping-up and down.

At the time of stepping-up, the step-down switch 23 (transistor) is needed to be continuously turned on. In a case in which a decreasing power supply (for example, battery) voltage is increased to a voltage required for a gate voltage of the transistor by the bootstrap circuit, in order to satisfy requirement of the on-resistance at the time of stepping-up, the area of the step-down switch 23 is needed to be large. Meanwhile, without increasing the area of the step-down switch 23, the charge pump circuit is capable of supplying a sufficient gate voltage for continuously turning on the transistor (step-down switch 23) at the time of stepping-up.

At the time of stepping-down, a switching operation of the step-down switch 23 (transistor) is needed to be performed.

Since the current is consumed through the inductor 9 in the switching operation which is different from an operation for continuously turning on, the current driving capability is needed to be increased in the charge pump circuit. Therefore, a large capacity external capacitor is needed. Meanwhile, the bootstrap circuit has the low output voltage level, but may become a problem at the time of stepping-down when the power supply (for example, battery) voltage is high. Further, since the sufficient current driving capability for switching the transistor (step-down switch 23) at the time of stepping-down is included, the capacitor is not needed to be large.

For the reasons described above, outputting of the bootstrap circuit 7 and the charge pump circuit 21 are used in a switching manner at the time of the step-up operation and the step-down operation in this example.

<4. Configuration Example of Step-Down Switch>

As another specific configuration example of the step-down switch 23, the step-down switch may be configured to use a first switching element and a second switching element having a smaller element area than that of the first switching element which are connected in parallel. In this case, when the step-up unit is operated, the first switching element is turned on by the voltage of the charge pump circuit 18, and when the step-down unit is operated, the second switching element is turned on by the voltage of the bootstrap circuit 7. Switching characteristics suitable for at the time of stepping-up and down are obtained.

The invention is not limited to the above-described embodiments, and includes various modification examples. For example, it is possible to replace a part of a configuration of one example with a configuration of another example, and also to add the configuration of one example to the configuration of another example. In addition, it is possible to add, delete, or replace the configuration of another example with respect to the part of the configuration of each example.

A function of the "source" or "drain" of the transistor is changed in a case in which a transistor having different polarity is adopted, a case a direction of a current is changed in a circuit operation, or the like. Therefore, in this specification, a term of the "source" or "drain" can be used by being changed.

INDUSTRIAL APPLICABILITY

The invention relates to the switching power supply, and more particularly, it is possible to be used for an on-vehicle step-up/down power supply that generates a voltage for a micro-computer, or the like.

REFERENCE SIGNS LIST 1, 15 step-down unit
2 step-up unit
3, 11, 23 switching element
4, 24 step-down driver
5, 8, 10 diode
6, 121 capacitor
7 bootstrap circuit
9 inductor
13 control circuit
14 step-up/down determining circuit
16 voltage switching circuit
17 charge pump initiation determining circuit
18 charge pump
19 oscillator
20 charge pump voltage determining circuit
21 charge pump circuit
22 gate voltage generating circuit
Vin input voltage of step-up/down power supply
Vin_boost input voltage of step-up/down power supply at the time of stepping-up
Vin_buck input voltage of step-up/down power supply at the time of stepping-down
Vo output voltage of step-up/down power supply
Vst, Vcptest, Vchange determining signal
Vosc pulse signal
Vdriver power supply voltage of step-down driver 24
Vcp output voltage of charge pump 18
Vb output voltage of bootstrap circuit 7
Vc_buck, Vc_boost output signal of control circuit
Vg gate voltage of switching elements 3 and 23
Vd drain voltage of switching elements 3 and 23
Vd_boost drain voltage of switching elements 3 and 23 at the time of stepping-up
Vs source voltage of switching elements 3 and 23
Vs_boost source voltage of switching elements 3 and 23 at the time of stepping-up
Iin input current of step-up/down power supply
Iin_boost input current of step-up/down power supply at the time of stepping-up
Iin_buck input current of step-up/down power supply at the time of stepping-down
Vf forward voltage value of diode 5 of bootstrap circuit 7
Vgs gate-source voltage of switching elements 3 and 23
Vgs_boost gate-source voltage of switching elements 3 and 23 at the time of stepping-up
Vgs_buck gate-source voltage of switching elements 3 and 23 at the time of stepping-down
Vds drain-source voltage of switching elements 3 and 23

The invention claimed is:

1. A step-up/down power supply comprising:
a step-down unit that generates an output voltage lower than an input voltage by turning on or off a step-down switch in which the input voltage of the step-up/down power supply is applied to an end of the step-down switch;
a step-up unit that generates an output voltage higher than the input voltage by turning on or off a step-up switch in which a ground is applied to an end of the step-down switch; and
a step-down gate voltage control circuit that controls a gate voltage of the step-down switch,
wherein the step-down gate voltage control circuit includes a gate voltage generating circuit that generates a first voltage and a second voltage for turning on the step-down switch, and a gate voltage switching circuit that switches between the first voltage and the second voltage,
wherein the gate voltage generating circuit includes a first generating circuit generating the first voltage and a second generating circuit generating the second voltage,
wherein a load current for driving the second generating circuit is greater than that of the first generating circuit,
wherein the gate voltage switching circuit:
when the input voltage is equal to or lower than a first voltage threshold corresponding to the output voltage and a voltage generated from the first generating circuit becomes the first voltage, switches a voltage for turning on the step-down switch to the first voltage, and
when the input voltage is higher than the first voltage threshold, switches the voltage for turning on the step-down switch to the second voltage,
wherein the gate voltage switching circuit includes:
an initiation determining circuit in which output is transitioned from Low to High in order to initiate the first generating circuit;
a voltage determining circuit in which output is transitioned from Low to High in a case in which a voltage generated from the first generating circuit is the first voltage; and
a step-up/down determining circuit in which output is transitioned from Low to High in a case in which the input voltage is equal to or lower than the first voltage threshold corresponding to the output voltage, and output of the voltage determining circuit is from Low to High, and
wherein the initiation determining circuit is reset by an operation of switching the output of the step-up/down determining circuit from High to Low, and a state of the first generating circuit becomes a stop state from an operation state by switching the output from High to Low.

2. The step-up/down power supply according to claim 1, wherein the gate voltage switching circuit switches a voltage for turning on the step-down switch to the first voltage when the step-up unit is operated, and switches a voltage for turning on the step-down switch to the second voltage when the step-down unit is operated.

3. The step-up/down power supply according to claim 1, wherein, in the gate voltage generating circuit, when the step-up unit is operated, a voltage level of the second voltage generated from the second generating circuit is equal to or lower than a voltage level of the first voltage generated by the first generating circuit.

4. The step-up/down power supply according to claim 1, wherein the first generating circuit is constituted by a charge pump circuit, and
wherein the second generating circuit is constituted by a bootstrap circuit.

5. The step-up/down power supply according to claim 1,
wherein the step-up unit is operated when the input voltage is equal to or lower than the first voltage threshold corresponding to the output voltage, and
wherein the step-down unit is operated when the input voltage is higher than the first voltage threshold.

6. The step-up/down power supply according to claim 1,
wherein, as the step-down switch, a first switching element and a second switching element having a smaller element area than that of the first switching element which are connected in parallel are used,
wherein the first switching element is turned on by the first voltage when the step-up unit is operated, and
wherein the second switching element is turned on by the second voltage when the step-down unit is operated.

7. The step-up/down power supply according to claim 1,
wherein the first generating circuit is operated when the input voltage becomes lower than a second voltage threshold,
wherein the first generating circuit is stopped when the input voltage becomes higher than the first voltage threshold, and
wherein the second voltage threshold is higher than the first voltage threshold.

* * * * *